Oct. 10, 1950  O. M. GAHAGAN  2,525,069
AUTOMATIC CATHEAD

Filed March 4, 1946  3 Sheets-Sheet 1

INVENTOR
Orren M. Gahagan.
BY
Fishburn & Mullendore
ATTORNEYS

Oct. 10, 1950 — O. M. GAHAGAN — 2,525,069
AUTOMATIC CATHEAD
Filed March 4, 1946 — 3 Sheets-Sheet 2

INVENTOR
Orren M. Gahagan.
BY
Fishburn & Mulleadi
ATTORNEYS

Oct. 10, 1950     O. M. GAHAGAN     2,525,069
AUTOMATIC CATHEAD
Filed March 4, 1946     3 Sheets-Sheet 3
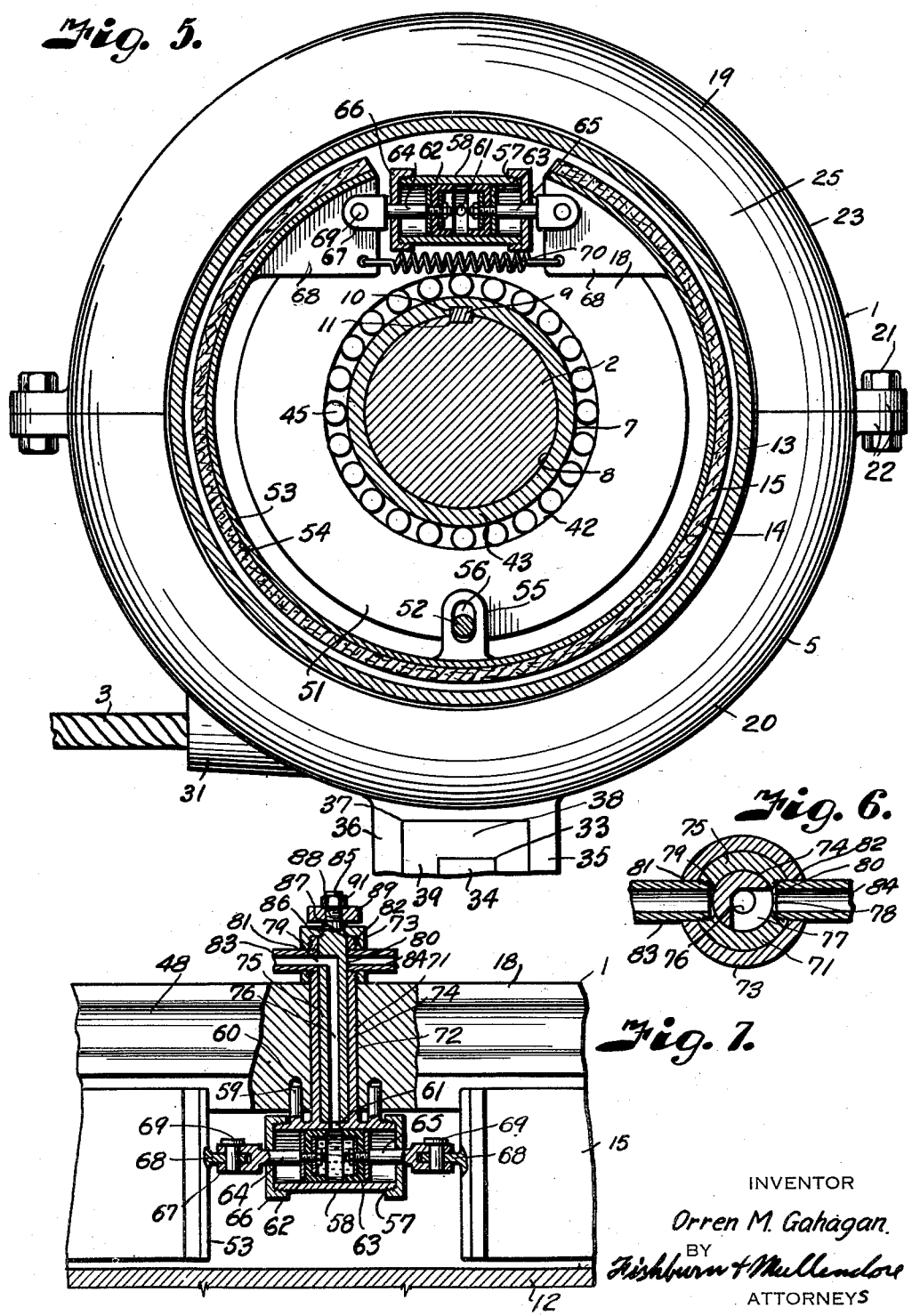
INVENTOR
Orren M. Gahagan.
BY
Fishburn & Mullendore
ATTORNEYS Patented Oct. 10, 1950

2,525,069

UNITED STATES PATENT OFFICE 2,525,069

AUTOMATIC CATHEAD

Orren M. Gahagan, Dallas, Tex.

Application March 4, 1946, Serial No. 651,942

14 Claims. (Cl. 254—173)

This invention relates to automatic catheads such as used for operating a jerk line employed in setting up and/or breaking tool joints of drill pipe and similar purposes encountered in operation of rotary drilling and has for its principal objects to provide a device of this character with a pressure fluid controlled clutch mechanism for connecting and disconnecting rotary power with the jerk line.

Other objects of the invention are to provide for remotely controlling flow of pressure medium to the clutching elements of the device; to provide for automatically reversing the flow of pressure medium responsive to actuation of the cathead for effecting disengagement of the clutch element; and to provide a valve for controlling flow of the pressure fluid responsive to actuation of the jerk line sheave.

It is also an object of the invention to provide for reverse flow of the pressure fluid to the supply source, thereby assuring quick release of the clutch element.

Further objects of the invention are to provide a device of this character that is extremely compact and composed of few parts that are simple to manufacture and which are readily assembled; and to provide a structure which reduces shock incidental to application of power on the jerk line and resultant recoil of the line incidental to breaking loose of a threaded joint.

In accomplishing these and other objects of the invention, I have provided improved structure, the preferred form of which is illustrated in the accompanying drawings wherein:

Fig. 5 is an enlarged section on the line 5—5 of Fig. 3.

Fig. 6 is an enlarged cross section through the control valve showing the inlet and outlet ports.

Fig. 7 is a detail section through the jerk line sheave at the point of the control valve and illustrating its connection with the actuating unit of the friction clutch band.

Figure 1:
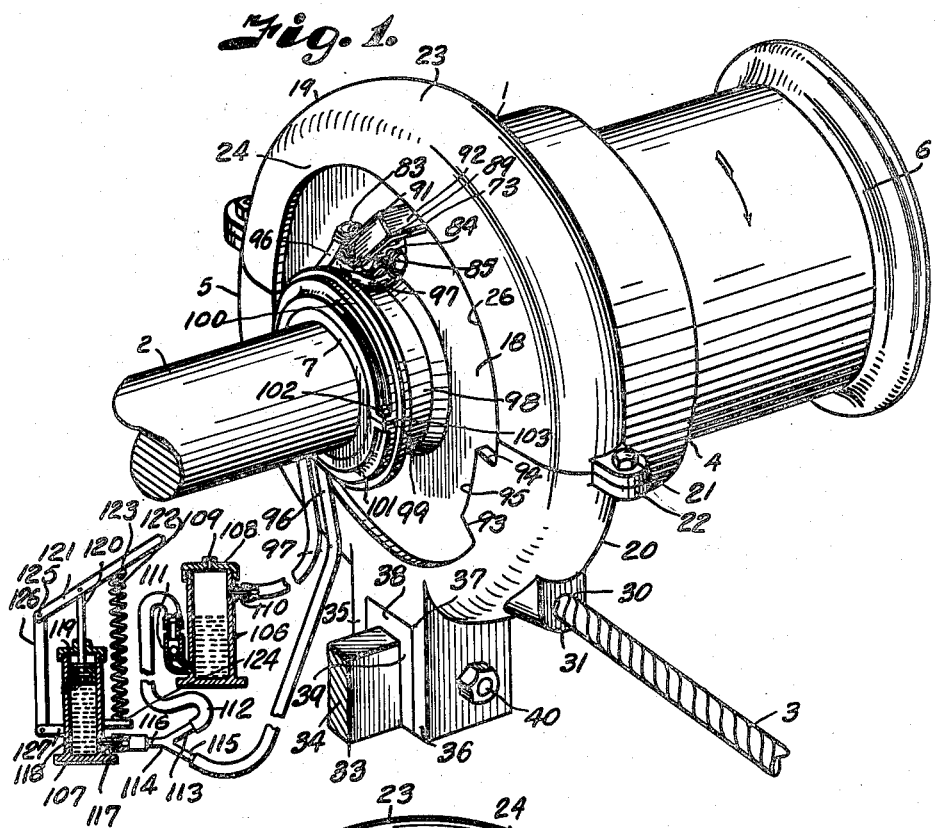
Fig. 1 is a perspective view of a pressure fluid actuated device constructed in accordance with the present invention, parts of the pressure fluid control apparatus being shown in section to better illustrate the construction.

Referring more in detail to the drawings:

1 designates a cathead embodying the features of the present invention and adapted for application to the line shaft 2 of a draw works in a rotary drilling rig and which is used for applying power to a jerk line 3, the jerk line 3 being connected with wrenches or tongs employed in the making up and/or breaking of joints of casing, tool joints of drill pipe, and like threaded connections incidental to drilling practices. In the illustrated instance, the cathead includes a rotor or driving member 4, a housing-like stator 5, and a catline spool 6 formed as a part of the rotor.

The rotor or driving member 4 includes a hub 7 having a bore 8 to pass the line shaft 2 when the rotor is mounted thereon and connected in driving relation therewith by a key 9 engaged in registering grooves 10 and 11 in the hub and shaft respectively. Extending circumferentially of the hub portion 7 at the outer end thereof is an annular web 12 carrying the spool 6 and a substantially cylindrical clutch flange or collar 13 that has an inner annular face 14 to be contacted by an expansible clutch element 15 later described. The clutch flange or collar is preferably formed separately of the rotor 4 and comprises a sleeve-like member having one edge engaging over the periphery of the web 12 and secured thereto by fastening devices such as screws 16. The opposite edge of the drum carries a circumferential flange 17 extending into the housing-like stator 5.

Figure 2:
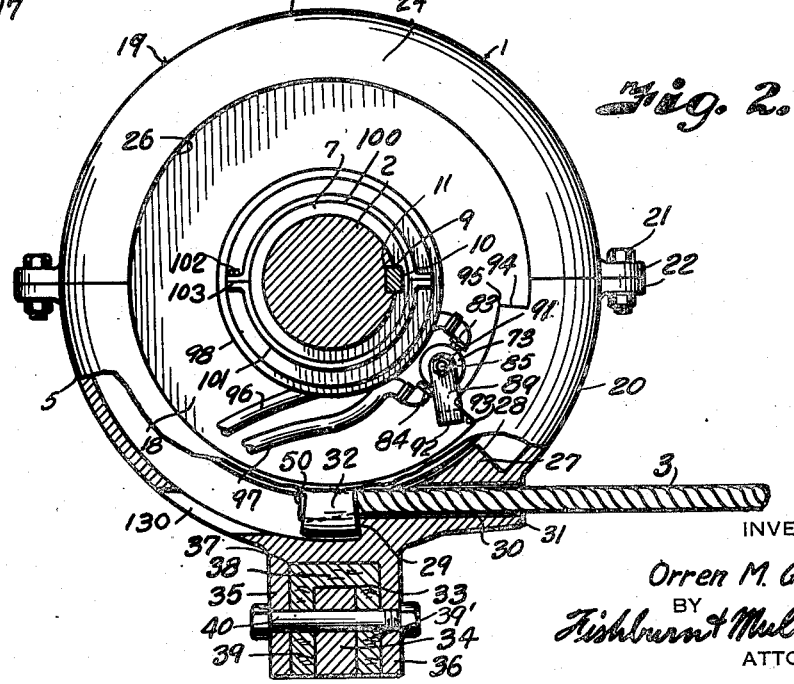
Fig. 2 is a cross section on the line 2—2 of Fig. 3 particularly illustrating the lug of the jerk line sheave in engagement with the stop rest of the stator and the lever of the automatic control valve in engagement with the stop that effects movement of the valving member to a position where the pressure fluid outlet duct is closed and the inlet duct is opened.
Figure 4:
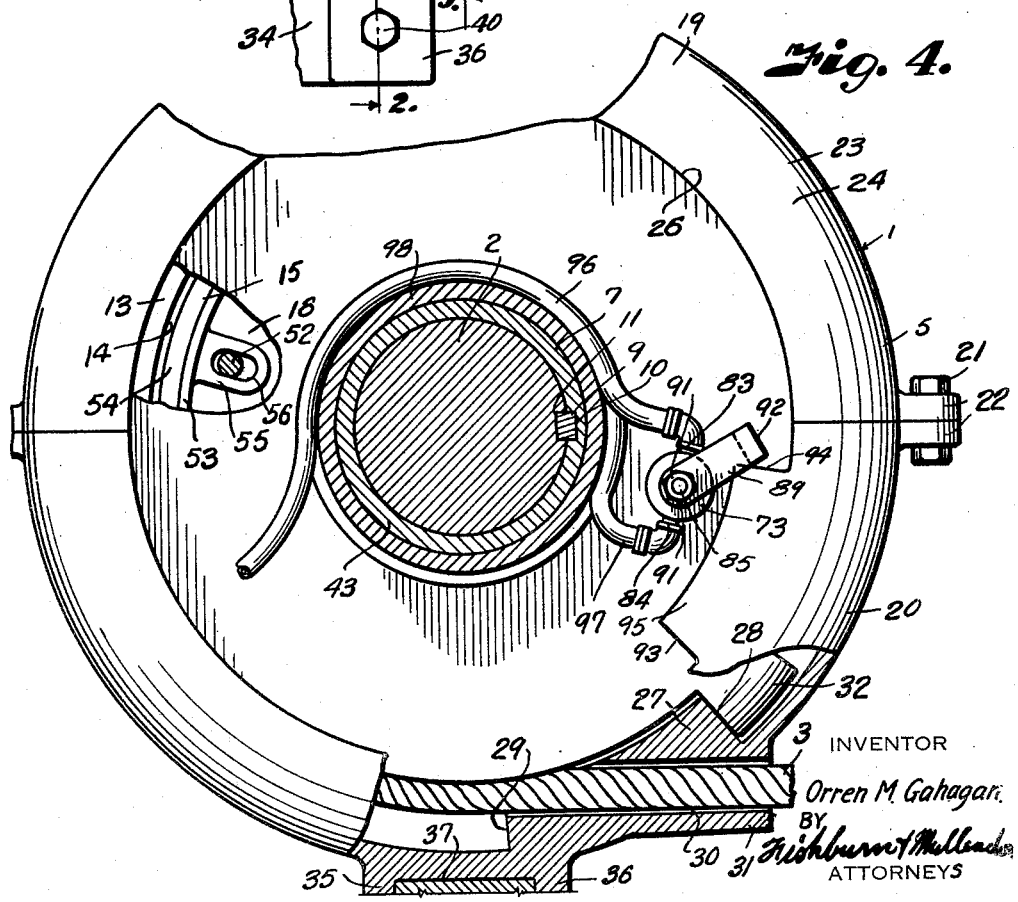
Fig. 4 is a sectional view similar to Fig. 2 but showing the sheave lug in stop engagement with the opposite side of the rest stop and the valve lever in position to establish communication of the clutch cylinder with the outlet duct and closure of the inlet duct.

The stator 5 encloses a sheave 18 for the jerk line 3. To facilitate assembly, the stator is preferably formed of mated sections 19 and 20 secured together by fastening devices such as bolts 21 extending through flanges 22 at the respective ends of the sections as best shown in Figs. 1, 2 and 4. The sections include outer walls 23 of substantially semi-circular cross section and inwarding extending sides 24 and 25, one of which encircles the collar 13 and the other an opening 26.

Carried within the section 20 of the stator is an inwardly extending lug 27 which may be formed integrally therewith to provide stop and rest faces 28 and 29 extending transversely across the housing, the rest face being located substantially in a plane extending through the vertical diameter and the stop face being located slightly below the horizontal diameter of the housing as shown in Fig. 2. Extending through the lug substantially parallel with a tangent of the stator is a bore 30 that opens through the rest face 29 and through a boss 31 on the exterior side of the housing section 20 as shown in Figs. 1, 2 and 4. The bore 30 is of sufficient size to pass the jerk line 3 freely therethrough for connection with a radially projecting lug 32 on the jerk line sheave 18 previously mentioned.

In order to support the stator in a relatively fixed position, and in substantially coaxial relation with the rotor, the stator is anchored to a fixed part of the draw works; for example, an adjacent jackpost (not shown) by a bracket 33 having an arm 34 positioned between spaced ears 35 and 36 on the lower section of the stator and which cooperate with the arm to embrace a shock absorbing pad 37. The shock absorbing pad is of channel shape to provide a web portion 38 engaged between the stator and the arm 34 and spaced parallel portions 39—39' engaged between the ears 35 and 36 and the respective sides of the arm 34 as best shown in Figs. 1 and 2. A fastening device such as a bolt 40 is passed through registering openings in the ears and the arm to retain the shock absorbing pad and the housing on the arm.

The jerk line sheave consists of a disk-like member 41 having an axial bore 42 to pass a reduced extension 43 of the hub 7. The jerk line sheave is counterbored as at 44 to cooperate with the reduced extension of the hub for accomodating an anti-friction bearing 45 including roller elements that are retained between a flange 46 formed by the inner end of the counterbore of the sheave and a shoulder 47 formed in the hub by reason of the reduced extension. The periphery of the sheave has a circumferential groove 48 of a size to accommodate the jerk line 3. The lug 32 extends transversely across the groove 48 and projects radially from the periphery of the sheave. The lug has an opening 49 extending therethrough and in which an anchor 50 on an end of the jerk line is engaged so that when the sheave is rotated to move the lug away from the rest face 29, the jerk line is extended about the groove of the sheave until the lug strikes the stop face 28 of the lug 27 as later described. The sheave has a hub portion 51 and carries a pin 52 for anchoring the clutch element 15.

The clutch element includes a flat flexible band 53 having a width substantially corresponding to the contact face 14 of the flange or drum 13 and which is lined on the contact face side with a friction material 54 such as a standard brake lining. The band is provided with an inwardly extending ear 55 having an elongated radial slot 56 therein to pass the anchoring pin 52 of the jerk line sheave, the elongated opening being of sufficient length to allow sufficient freedom of movement of the clutch band to bring the lining thereon into engagement with the inner face 14 of the flange or drum.

The ends of the band are spaced apart and interconnected by an actuator 57.

The actuator 57 includes a cylinder 58 secured in position by pins 59 extending from a side thereof and into sockets 60 (Fig. 7) in the jerk line sheave as best shown in Fig. 7. Slidable in the cylinder on the respective sides of a port 61 are pistons 62 and 63 fixed to rods 64 and 65 that project through heads 66 which close the open ends of the cylinder. The rods terminate in yokes 67 adapted for connection with ears 68 projecting inwardly from the respective ends of the clutch band as best shown in Fig. 5, the yokes being attached to the ears by pins 69. The band is normally retained in retractive position and the pistons near the mid portion of the cylinder by a spring 70 having the ends thereof hooked to the ears 68 at the respective ends of the band as best shown in Fig. 5. With the structure thus far described, it is obvious that the band is bodily carried by the jerk line sheave and is normally held out of contact with the flange of the rotor. Thus, the jerk line sheave is normally in idle position within the stator-like housing with the lug 32 engaging the rest face 29.

Figure 3:
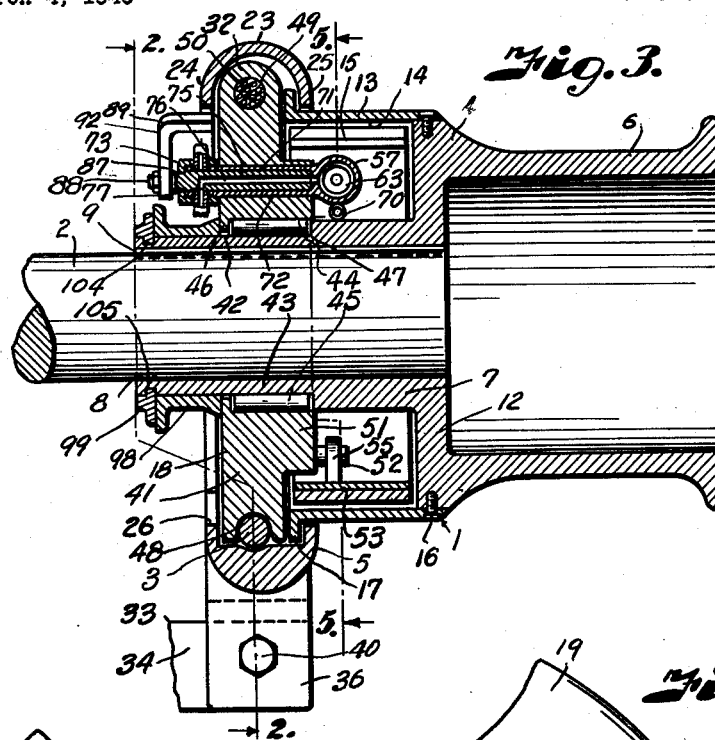
Fig. 3 is a longitudinal axial section through the device.

In order to introduce a pressure medium such as a hydraulic liquid through the port 61, to act between the pistons and force the pistons apart for moving the clutch band into frictional contact with face 14, the rotating collar 13, the cylinder connects with a lateral valve 71 located intermediate the pins 59 and mounted within a transverse opening 72 extending through the jerk line sheave. The valve 71 projects laterally from the exterior side of the sheave and carries a cap or packing nut 73 that is threadedly connected therewith. Oscillatably supported within the bore 74 of the valve is a valving member 75 having an axial port 76 in connection with the port 61 of the cylinder 58 and having a radial recess 77 opening through the periphery of the valving member in the form of an elongated port 78 (Fig. 6) which is adapted to register with diametrically arranged inlet and outlet ports 79 and 80 formed in the projecting end of the valve 71 and registering with openings 81 and 82 in the threaded cap 73 for accommodating inlet and outlet pipes or nipples 83 and 84 that are threaded into the respective ports. The valving member has a reduced stem 85 extending through an opening 86 in the closure cap 73 and which forms a shoulder 87 adapted to engage the closure cap and prevent axial withdrawal of the valve member. The reduced extension of the valving member has a reduced threaded terminal 88 mounting a lever arm 89 that is retained on the valving member by a fastening device such as a nut 91 threaded onto the terminal as best shown in Fig. 7. The lever arm 89 terminates in a lateral finger 92 extending into the opening 26 of the stator housing in position to engage the end faces 93 and 94 of an inwardly extending lug 95 formed on the edge of the stator housing wall 24 and located below the horizontal center of the stator housing and above the stop and rest lug 27 as best shown in Fig. 2. The inlet and outlet nipples are connected by flexible tubing 96 and 97 adapted to wrap about guide reel 98 that is rotatably mounted on the reduced portion of the hub and retained thereon by a ring 99. The ring 99 includes mated sections 100 and 101 secured together at the ends by fastening devices such as bolts 102 extending through registering lugs 103 on the ends of the respective sections. The inner circumference of the sections have an inwardly extending rib 104 rested within a circumferential groove 105 (Fig. 3) of the rotor hub.

From the periphery of the guide reel 98, the flexible tubing 97 and 96 lead from the valve to a reserve source 106 of pressure fluid and to a pump 107 respectively, the reserve source of pressure fluid comprising a vessel having a closed top 108 provided with a vent 109. The tubing forming the outlet duct 97 connects with the upper portion of the vessel 106 through a nipple 110 as shown in Fig. 1. The lower part of the vessel connects through a check valve 111 with a duct 112 that connects with a branch 113 of a Y-shaped fitting 114 having a branch 116 connected with the pump 107 as indicated at 117. The other branch 115 of the Y-shaped fitting 114 connects with the tubing 96 forming the inlet duct. The pump includes a cylinder 118 containing a piston 119 that is reciprocated by a rod 120 connected with an operating lever 121.

The piston 119 is normally retained in its uppermost position relative to the port 117 by means of a coil spring 122 having one end engaging a spring seat 124 extending laterally from the cylinder and its opposite end engaging a spring seat 123 carried by the actuating lever. The actuating lever is fulcrumed as at 125 with a link 126 having its opposite end pivotally secured to a bracket 127 extending from the side of the cylinder opposite the spring seat 124.

Assuming that the device is constructed and assembled as above described, the hub of the rotor is applied to the line shaft 2 of the draw works and secured by the key 9, the bracket 33 is attached to the adjacent jack post of the draw works and secured between the ears 35 and 36 of the stator housing by means of the bolt 40. The pump 107 is located with the operating lever 121 thereof in convenient reach of the driller. The storage tank 106 is located in any convenient position. The outlet tubing 97 is connected with the inlet 110 of the vessel 106 and with the outlet nipple 83 of the valve 71. The inlet tubing 96 is connected with the inlet nipple 84 of the valve 71 and with the branch 115 of the fitting 114, care being taken to drape the flexible tubes over the guide reel 98 so that they are guided thereabout upon turning of the jerk line sheave 18, the jerk line 3 being threaded through an opening 130 in the stator housing in the side opposite the bore 30 through which the jerk line operates so that the anchoring end of the jerk line engages the lug 32 of the sheave. The other end of the jerk line is adapted to be connected with the tongs (not shown) used in setting up and breaking the tool joints of the drill pipe during running in and out of the drill pipe or applying additional sections thereto as the drilling progresses.

When the rotary is in operation the shaft 2 is rotated to actuate the rotor of the cathead in a clockwise direction as indicated by the arrow in Fig. 1 with the hub thereof turning within the roller bearings 45 carried in the hub 51 of the sheave. When the jerk line is in the position shown in Fig. 2, the lug 32 on the sheave 18 is in engagement with the rest face 29 of the lug 27. In this position, the finger 92 of the valve arm 89 is in engagement with the face 93 of the lug 95 as shown in Fig. 2. The port 78 of the valving member is then in registry with the inlet port 79 so that the actuating cylinder 58 is in communication with the pump 107.

In idle position of the sheave, the pistons 62 and 63 have been drawn together by the action of the spring 70. The clutch element 15 is thus retained in contracted position with the driven face thereof out of contact with the driving face 14 of the rotor flange 13. The pump cylinder is kept filled with pressure liquid through upward movement of the piston 119 upon lifting of the pump lever 121 responsive to expansion of the spring 122. Upon upstroke of the piston, fluid is drawn from the storage vessel and passes the check valve 111 to flow through the duct 112, branch 113 of the fitting 114 and pump connection 117.

When the jerk line is to be used, for example, in breaking a joint, the tongs are applied in the customary manner and the free end of the jerk line connected therewith. The joint is then broken loose by applying power to the jerk line through the sheave upon engagement of the clutch element with the driving face of the rotor flange. This is effected when the operator shifts the lever 121 of the pump 107 against action of the spring 122 to move the piston 119 downwardly in the cylinder and effect displacement of the fluid contained therein through the pump connection 117, fitting 114 where the fluid under pressure is diverted through the branch 115, tubing 96, nipple 83, port 79, channel 76 of the valving member 75 and port 61 into the cylinder so that the pressure fluid acts upon the pistons to move the pistons apart in opposition to action of the spring 70, the pistons through the rods 64 and 65 apply pressure to the outer ends of the clutch band to move the band into driven contact with the driving face of the rotor flange. During this movement, the clutch band is expanded uniformly in contact with the driving face of the flange incidental to the pin and slot mounting thereof on the sheave 18. Upon contact of the clutch element with the driving flange of the rotor the sheave is caused to turn with the rotor and since the sheave is connected through the lug 32 with the jerk line, the jerk line wraps around the groove of the sheave until the lug 32 on the sheave comes into engagement with the stop face 28 of the lug 27. However, just prior to this engagement the finger 92 on the lever arm 89 of the valve 71 contacts the face 93 of the lug 94 on the stator causing the valve member to rotate so as to close the inlet port 79 and open the outlet port 80. The interior of the clutch actuating cylinder is then in connection with the vessel 106. Fluid is maintained under atmospheric pressure by reason of the vent port 109. Thus, there is a sudden drop in pressure so that the spring 70 is again effective in contracting the clutch band and releasing its engagement with the flange face 14 of the rotor. The pistons 62 and 63 being moved toward each other displace the pressure fluid through the port 61, channel 76 of the valve member 75, port 78, port 80, nipple 84, tubing 97, to the storage vessel 106. Upon breaking loose of the joint, the recoil of the jerk line returns the sheave to its rest position with the lug 27 thereof in engagement with the rest face 29. Just prior to this engagement, the finger 92 engages the face 93 of the lug 95 on the stator so that the valving member is returned to its original position with the port thereof in connection with the inlet port so as to reestablish connection with the pump and shut off the connection with the storage vessel.

From the foregoing it is obvious that I have provided an automatic cathead adapted for remote control by means of a fluid pressure medium for connecting and disconnecting rotary power with the jerk line. It is obvious that I have provided a device that is extremely compact and composed of few parts that are simple to manufacture and readily assembled and which in action reduces shock incidental to the frictional connection between the rotor and jerk line sheave.

What I claim and desire to secure by Letters Patent is:

1. A device of the character described including a rotor, a jerk line sheave supported in position to be actuated by the rotor in one direction, a stator, a jerk line connected with the sheave and adapted to wrap about the sheave upon turning of the sheave in said direction and to rotate the sheave in the opposite direction, fluid pressure actuated means between the rotor and sheave for interconnecting the sheave with the rotor to turn the sheave in the first mentioned direction, a valve carried by the jerk line sheave and connected with the fluid pressure actuated means for controlling supply of pressure medium to the fluid pressure actuated means, a valve operating arm spaced stops on the stator in the path of said arm for actuating the valve for admitting and discharging the pressure medium, a vessel for storing the discharged pressure medium, a duct connecting the valve with the vessel, a pump, and ducts connecting the pump with the vessel and the valve for delivering the pressure fluid from the vessel to the valve for effecting actuation of the fluid pressure actuated means.

2. In a device of the character described, a rotor having a hub, a jerk line sheave loosely mounted on the hub of the rotor, a clutch engaging flange on the rotor, an expandable clutch element carried by the jerk line sheave and adapted to engage said flange, fluid pressure actuated means for expanding the clutch element into contact with the clutch engaging flange to rotate the sheave in one direction, a valve carried by the sheave and having a valving member provided with a port for respectively connecting the pressure actuated means with inlet and outlet ports of said valve, flexible ducts respectively connected with the inlet and outlet ports of said valve, a vessel for containing fluid medium and having connections with the flexible duct leading from the outlet port of said valve, a pump having connection with the vessel and with the other of the flexible ducts for drawing fluid from said vessel and discharging the fluid under pressure to the inlet port of the valve, and means responsive to turning of the jerk line sheave in opposite directions for actuating the valving member of said valve.

3. In a device of the character described, a rotor having a hub, a jerk line sheave loosely mounted on the hub of the rotor, a clutch engaging flange on the rotor, an expandable clutch element carried by the sheave and adapted to engage said flange, fluid pressure actuated means for expanding the clutch element into contact with the clutch engaging flange to rotate the sheave in one direction, a valve carried by the sheave and having a valving member provided with a port for respectively connecting the pressure actuated means with inlet and outlet ports of said valve, a guide reel loosely mounted on the hub of the rotor, flexible ducts adapted to be guided over said reel upon rotation of the sheave and respectively connected with the inlet and outlet ports of said valve, a vessel for containing fluid pressure medium and having connection with the flexible duct leading from the outlet port of said valve, a pump having connection with the vessel and with the other of the flexible ducts for drawing fluid from said vessel and discharging the fluid under pressure to the inlet port of the valve, a stator enclosing the sheave, and stops on the stator, an operating arm connected with the valving member and engageable with one of the stops when the sheave is rotated in one direction by said rotor and with the other stop when said sheave is rotated in reverse direction by said jerk line.

4. In a device of the character described, a rotor having a hub, a jerk line sheave loosely mounted on the hub of the rotor, a clutch engaging flange extending circumferentially of the rotor, an expandable clutch element carried by the sheave and adapted to engage said flange, fluid pressure actuated means for expanding the clutch element into contact with the clutch engaging flange to rotate the sheave in one direction, a valve carried by the sheave and having a valving member provided with a port for respectively connecting the pressure actuated means with inlet and outlet ports of said valve, a guide reel loosely mounted on the hub of the rotor, flexible ducts adapted to be guided over said reel upon rotation of the sheave and respectively connected with the inlet and outlet ports of said valve, and means for moving the valving member to said positions responsive to turning of said sheave.

5. In a device of the character described, a rotor having a hub, a jerk line sheave loosely mounted on the hub of the rotor, a clutch engaging flange on the rotor, an expandable clutch element carried by the sheave and adapted to engage said flange, fluid pressure actuated means for expanding the clutch element into contact with the clutch engaging flange to rotate the sheave in one direction, a valve carried by the sheave and having a valving member provided with a port for connecting the pressure actuated means with inlet and outlet ports of said valve respectively, a guide reel loosely mounted on the hub of the rotor, flexible ducts adapted to be guided over said reel upon rotation of the sheave and respectively connected with the inlet and outlet ports of said valve, a vessel for containing fluid pressure medium and having connection with the flexible duct leading from the outlet port of said valve, a pump having connection with the vessel and with the other of the flexible duct for drawing fluid from said vessel and discharging the fluid under pressure to the inlet port of the valve, a stator enclosing the sheave, a stop on the stator, an operating arm connected with the valving member and engageable with the stop when the sheave is rotated in said one direction for closing the inlet port and opening the outlet port to effect release of the clutch element, and a stop on the stator for engaging the operating arm of the valve to return the valving member to position for connecting the inlet port with the pump upon reverse rotation of the sheave.

6. A device of the character described including a rotor, a jerk line sheave supported in position to be actuated by the rotor in one direction, a jerk line connected with the sheave and adapted to wrap about the sheave upon turning of the sheave in said direction and to rotate the sheave in the opposite direction under pull of the jerk line, a stator, stops on the stator for limiting said rotation of the sheave in its respective directions, fluid pressure actuated means between the rotor and sheave for interconnecting the sheave with the rotor to turn the sheave in the first mentioned direction, a valve having trip engaging means for controlling supply of pressure medium to the fluid pressure actuated means, and trip means having trip faces for engagement by said trip engaging means and positioned on the stator relative to the stops for actuating the valve in correspondence with the limits of movement of the sheave for admitting pressure medium through the valve and for discharging the pressure medium.

7. A device of the character described including a rotor, a jerk line sheave supported in position to be actuated by the rotor in one direction, a jerk line connected with the sheave and adapted to wrap about the sheave upon turning of the sheave in said direction and to rotate the sheave in the opposite direction, fluid pressure actuated means between the rotor and sheave for interconnecting the sheave with the rotor to turn the sheave in the first mentioned direction, a stator, means on the stator for limiting turning of the sheave in both of said directions, a valve for controlling supply of pressure medium to the fluid pressure actuated means, trip means having positions on the stator relative to said limiting means for actuating the valve responsive to said limited turning movement of the sheave in the respective directions for admitting pressure medium through the valve and for discharging the pressure medium, a vessel for storing the discharged pressure medium, a duct connecting the valve with the vessel, and a pump connected with the vessel and the valve for delivering the pressure fluid from the vessel to the valve for effecting operation of the fluid pressure actuated means.

8. In a device of the character described, a rotor, a sheave member having coaxial support with the rotor, a stator having spaced stops, a projection on the sheave member for engaging said stops to limit turning movement of the sheave member in opposite directions, a jerk line connected with said sheave member, means for retaining the stator member in fixed position, clutch means adapted for interconnecting the rotor with the sheave member to effect turning of the sheave member with the rotor to wind the jerk line on the sheave member as limited by said stops, fluid pressure actuated means carried in rotation with the rotor and sheave member for operating the clutch means, a pressure medium control valve carried by one of said members and having an actuating arm, a duct connecting said valve with the fluid pressure actuated means, a duct connecting the valve with a source of fluid pressure supply, a pressure release duct connected with the valve, and means on the other of said members for engaging the arm to effect actuation of said control valve to shut off the supply of fluid pressure medium from the pressure medium supply duct and open the relief duct when the projection on the sheave approaches one of said stops under turning of the sheave member by said rotor and to reestablish said flow of fluid pressure medium from the pressure medium supply duct after the sheave member reverses rotation and the projection thereon engages the other of said stops.

9. In a device of the character described, a rotor, a sheave member having coaxial support with the rotor, a stator member having stops on the respective sides of a jerk line opening extending through said stator, a projection on the sheave member for engaging said stops to limit turning movement of the sheave member in opposite directions, a jerk line extending through the opening and connected with said sheave member, means for retaining the stator member in fixed position, clutch means adapted for interconnecting the rotor with the sheave member to effect turning of the sheave member with the rotor to wind the jerk line on the sheave member as limited by said stops, fluid pressure actuated means carried in rotation with the rotor and sheave member for operating the clutch means, a pressure medium control valve carried by one of said members and having an actuating arm, a duct connecting said valve with the fluid pressure actuated means, a duct connecting the valve with a source of fluid pressure supply, a pressure release duct connected with the valve, and means on the other of said members for engaging the arm to effect actuation of said control valve to shut off the supply of fluid pressure medium from the pressure medium supply duct and open the relief duct when the projection on the sheave approaches one of said stops under turning of the sheave member by said rotor and to reestablish said flow of fluid pressure medium from the pressure medium supply duct after the sheave member reverses rotation and the projection thereon engages the other of said stops.

10. In an automatic cathead, a rotor, a sheave member having coaxial support with the rotor, a stator member having stops on the respective sides of a jerk line opening extending through said stator, a stop engaging projection on the sheave member for engaging said stops to limit turning movement of the sheave member in opposite directions, a jerk line extending through the opening and connected with said sheave member, means for retaining the stator member in fixed position, clutch means adapted for interconnecting the rotor with the sheave member to effect turning of the sheave member with the rotor to wind the jerk line on the sheave member as limited by said stops, fluid pressure actuated means carried in rotation with the rotor and sheave member for operating the clutch means, a pressure medium control valve carried by one of said members and having an actuating arm, a duct connecting said valve with the fluid pressure actuated means, a duct connecting the valve with a source of fluid pressure supply, a pressure release duct connected with the valve, means on the other of said members for engaging the arm to effect actuation of said control valve to shut off the supply of fluid pressure medium from the pressure medium supply duct and open the relief duct when the projection on the sheave approaches one of said stops under turning of the sheave member by said rotor and to re-establish said flow of fluid pressure medium from the pressure medium supply duct after the sheave member reverses rotation and the projection thereon engages the other of said stops, and a guide reel rotatable about the axis of the rotor for guiding ducts that are connected with rotating parts of said cathead.

11. A device of the character described including a rotor member, a sheave member supported in position to be actuated by the rotor in one direction, a jerk line connected with the sheave member and adapted to wrap about the sheave member upon turning of the sheave member in said direction and to rotate the sheave member in the opposite direction under pull on the jerk line, a friction element having self-adjusting support on one of the members and expandable into frictional contact with the other member, a pressure cylinder for expanding the friction element to turn the sheave member in the first mentioned direction, a stator, means on the stator for limiting turning of the sheave member in both of said directions, a valve for controlling supply of pressure medium to the cylinder, trip means having positions on the stator relative to said limiting means for actuating the valve responsive to said limited turning movement of the sheave in the respective directions for admitting pressure medium through the valve and for discharging the pressure medium, a vessel for storing the discharged pressure medium, a duct connecting the valve with the vessel, and a pump connected with the vessel and the valve for delivering the pressure fluid from the vessel to the valve for effecting operation of the fluid pressure actuated means.

12. A device of the character described including a rotor member, a sheave member supported in position to be actuated by the rotor in one direction, a jerk line connected with the sheave member and adapted to wrap about the sheave member upon turning of the sheave member in said direction and to rotate the sheave member in the opposite direction under pull on the jerk line, a stator, stops on the stator for limiting said rotation of the sheave in its respective directions, a friction element having self-adjusting support on one of the members and expandable into frictional contact with the other member, a pressure cylinder for expanding the friction element for interconnecting the sheave member with the rotor member to turn the sheave member in the first mentioned direction, a valve having trip engaging means for controlling supply of pressure medium to the cylinder, and trip means having trip faces for engagement by said trip engaging means and positioned on the stator relative to the stops for actuating the valve in correspondence with the limits of movement of the sheave member in said directions for admitting pressure mediums through the valve and for discharging the pressure medium.

13. A device of the character described including a rotor having a hub, a jerk line sheave loosely supported on the hub, a jerk line connected with the sheave and adapted to wrap about the sheave upon turning of the sheave in one direction and to rotate the sheave in the opposite direction under pull of the jerk line, fluid pressure actuated means between the rotor and sheave for interconnecting the sheave with the rotor to turn the sheave in the first mentioned direction, a stator, means on the stator for limiting turning of the sheave in both of said directions, a valve carried by the sheave for controlling supply of pressure medium to the fluid pressure actuated means, trip means having positions on the stator relative to said limiting means for actuating the valve responsive to said limited turning movement of the sheave in its respective directions for admtting pressure medium through the valve and for discharging the pressure medium, a reel freely rotatable on the hub of the rotor, and flexible pressure medium supply and release ducts connected with the valve and adapted to wrap and unwind from the reel upon turning of the sheave.

14. A device of the character described including a rotor, a jerk line, a sheave member for the jerk line having coaxial support relatively to the rotor for rotation in opposite directions and having stop engaging means, a stator member encasing the sheave member and having spaced stops thereon for contact with the stop engaging means of the sheave member for limiting turning movement of the sheave member in both directions, a clutch for connecting the sheave member in driven relation with the rotor to turn the sheave member under power in one direction to wrap the jerk line on said sheave member, fluid pressure means for actuating the clutch, duct means for conducting fluid pressure medium to said clutch actuating means and for releasing said pressure medium, a control valve having connection in said duct means for controlling flow of fluid pressure medium, valve trip means carried by one of said members, and spaced trip engaging means located on the other of said members in relation with said stops to engage the trip means for actuating the control valve in timed relation with limits of movement of the sheave member.

ORREN M. GAHAGAN.

REFERENCES CITED

The following references are of record in the file of this patent:

UNITED STATES PATENTS

| Number | Name | Date |
| --- | --- | --- |
| 1,020,066 | Westbrook | Mar. 12, 1912 |
| 1,745,988 | Foster | Feb. 4, 1930 |
| 1,971,715 | Hartley | Aug. 28, 1934 |
| 2,159,137 | Doty | May 23, 1939 |
| 2,197,063 | Ashton | Apr. 16, 1940 |
| 2,201,878 | Atkins | May 21, 1940 |